March 11, 1958     C. G. GORDON     2,826,465
SHAFT SEAL
Filed March 7, 1955
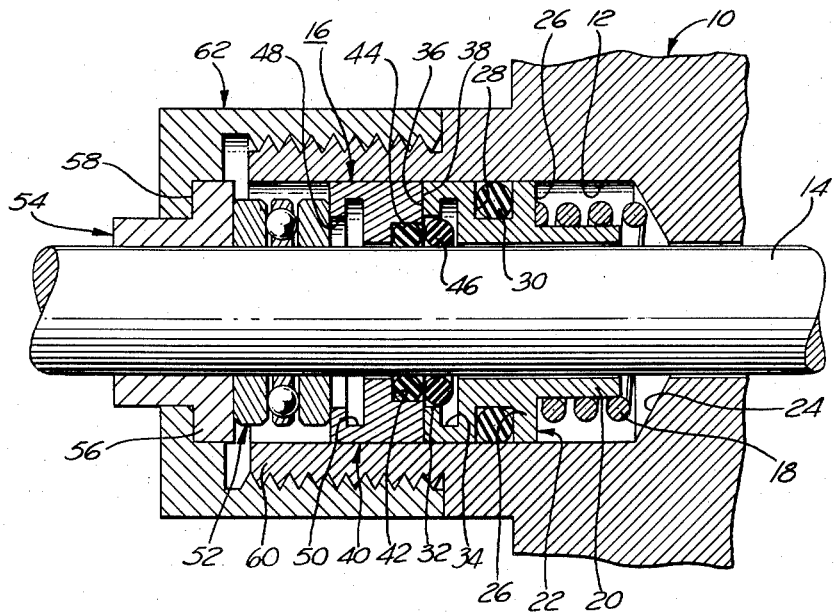
INVENTOR.
CARROLL G. GORDON
BY HIS ATTORNEYS.
HARRIS, KIECH, FOSTER & HARRIS

2,826,465

SHAFT SEAL

Carroll G. Gordon, Pasadena, Calif., assignor to Fletcher Aviation Corporation, Rosemead, Calif., a corporation of California Application March 7, 1955, Serial No. 492,546

7 Claims. (Cl. 308—187.1)

The present invention relates to shaft seals, and a general object of the invention is to provide a shaft seal which is readily installable and removable so that it may be replaced or repaired easily, and which is inexpensive to manufacture so that it may be replaced frequently if required by the conditions under which it must operate.

Another object is to provide a shaft seal which is satisfactory for use in sealing liquid chambers, such as pump chambers, from which extend shafts that must operate at high speeds for long periods of time.

Another object is to provide a shaft seal which is insertable into a cylindrical recess formed in a housing and encircling the shaft to be sealed relative to the housing, and which includes two sealing rings having interengaged sealing faces, a compression spring for maintaining the sealing faces of the two sealing rings in engagement, a thrust bearing for taking the thrust of the compression spring, and adjustable means connected to the housing for retaining these elements in the recess and for varying the extent of compression of the spring to vary the spring force applied to the two sealing rings. A related object is to provide a retaining means which includes a journal bearing for the shaft and which includes a nut engaging the journal bearing and threadedly connected to the housing.

Another object is to provide a sealing ring having a bore therethrough for the shaft and having in one end thereof a counterbore which communicates with the bore and which receives a packing element engageable with such sealing ring and the shaft, and to provide means for retaining the packing element in the counterbore in the sealing ring which includes another packing element encircling the shaft adjacent the open end of the counterbore. With this construction, there is no necessity for machining an internal groove in the sealing ring for the packing element which is disposed between the sealing ring and the shaft, this being an important feature of the invention.

The foregoing objects, advantages and features of the present invention, together with various other objects, advantages and features thereof which will become apparent, may be attained with the exemplary embodiment of the invention which is illustrated in the accompanying drawing and which is described in detail hereinafter, the drawing being a longitudinal sectional view of the shaft seal of the invention.

In the drawing, the numeral 10 designates a housing containing a liquid chamber, not shown, the housing 10 being the housing of a pump, for example. The housing 10 is provided with a cylindrical recess 12 therein and a shaft 14 extends into this recess from the interior of the housing. The shaft seal of the invention, designated generally by the numeral 16, is disposed in the recess 12 and encircles the shaft 14.

Considering the shaft seal 16, it includes a compression spring 18 which encircles a tubular extension 20 on a sealing ring 22 and which is seated against the inner end 24 of the recess 12 and against an annular shoulder 26 on the sealing ring 22. The sealing ring 22 is provided with an external annular groove 28 which contains an O-ring 30, or other packing element, this O-ring engaging the sealing ring 22 and the housing 10 to provide a fluid-tight seal therebetween. The sealing ring 22 is provided with a counterbore 32 at its outer end, and the inner end of this counterbore is provided with an undercut 34 for the reception of a suitable tool, not shown, for removing the sealing ring 22 from the recess 12. The counterbore 32 permits insertion of a suitable tool into the undercut 34, and serves another function to be described.

The sealing ring 22 terminates at its outer end in a sealing face 36 which is engaged by a sealing face 38 on the inner end of an outer sealing ring 40. The latter is provided at its inner end with a counterbore 42 for an O-ring 44, or other packing element, which engages the sealing ring 40 and the shaft 14 to provide a fluid-tight seal therebetween. Thus, the O-ring 30 seals the inner sealing ring 22 with respect to the housing 10, the interengaging sealing faces 36 and 38 seal the inner and outer sealing rings 22 and 40 with respect to each other, and the O-ring 44 seals the outer sealing ring with respect to the shaft 14, the spring 18 maintaining interengagement between the sealing faces 36 and 38.

The O-ring 44 is retained in the counterbore 42 by an O-ring 46, or other packing element, encircling and carried by the shaft 14, the counterbore 32 in the inner sealing ring 22 being large enough to prevent engagement of the O-ring 46 with the sealing ring 22. With this construction, machining of an internal groove for the O-ring 44 is avoided, this being an important feature since machining of internal O-ring grooves is an expensive operation, it being necessary to machine such grooves accurately.

At its outer end, the outer sealing ring 40 is provided with a counterbore 48 for insertion into an undercut 50 at the inner end of such counterbore of a suitable tool for removing the sealing ring 40 from the recess 12. Preferably, the counterbore 48 and the undercut 50 are identical to the counterbore 32 and the undercut 34, respectively, in the inner sealing ring 22 to permit the use of the same tools for forming them, thus reducing manufacturing costs.

Seated against the outer end of the outer sealing ring 40 is a thrust bearing 52 which takes the thrust provided by the compression spring 18. The outer end of the thrust bearing 52 is seated against a journal bearing 54 which forms part of a retaining means for the elements within the recess 12. More particularly, the journal bearing 54 is provided with an external flange 56 at its inner end, thereby providing an annular shoulder 58. Seated against the shoulder 58 and threaded on a tubular extension 60 of the housing 10 is a gland nut 62 to retain the various elements within the recess 12. With this construction, by varying the extent to which the nut 62 is threaded on the tubular extension 60 of the housing 10, the extent of compression of the spring 18 may be varied to vary the normal, sealing force existing between the sealing faces 36 and 38.

As will be apparent, the shaft seal 16 may be installed very readily by slipping the elements thereof over the shaft 14 and threading the nut 62 onto the tubular extension 60 of the housing 10. In removing the seal 16, the spring 18 displaces the various elements thereof toward the outer end of the recess 12 upon unscrewing of the nut 62 from the housing 10 so that the thrust bearing 52 is readily accessible for removal from the shaft 14. This accomplished, a suitable tool is inserted into the undercut 50 in the outer sealing ring 40 to remove this sealing ring. Subsequently, the same tool may be inserted into the undercut 34 in the inner sealing ring 22 to permit removal of this sealing ring and the O-rings 30 and 46, as well as the O-ring 44 if this O-ring did not come out with the sealing ring 40. The spring 18 may then be removed readily if necessary.

Thus, it will be apparent that the present invention provides a shaft seal which may be installed and removed readily and which is of simple construction and inexpensive to manufacture so that it, or various parts thereof, may be replaced frequently as required. It will be noted that the only sealing parts subject to wear are the sealing faces 36 and 38, there being no relative movement between the O-ring 30 and the housing 10 or the sealing ring 22, and there being no relative movement between the O-ring 46 and the shaft 14, or between the O-ring 44 and the shaft 14 or the sealing ring 40. Wear of the thrust bearing 52 and the journal bearing 54 is minimized since none of the liquid from the chamber being sealed can reach these bearings.

Although I have disclosed an exemplary embodiment of my invention herein for purposes of illustration, it will be understood that various minor changes, modifications and substitutions may be incorporated in such embodiment without departing from the spirit of the invention as defined by the claims allowed to me and appearing hereinafter.

I claim as my invention:

1. In combination: a housing; a shaft in said housing; a series of interengaged rotary seal elements encircling and successively axially positioned along said shaft, including two sealing elements having interengaged sealing faces, one of said elements being rotatable with said shaft and the other of said elements being adapted to remain stationary relative to shaft rotation, a spring disposed between said housing and said other sealing element for biasing said sealing elements together to maintain interengagement of said sealing faces, a thrust bearing engaged by an end of said one sealing element remote from its sealing face, and a retainer connected to said housing and abutting said thrust bearing for maintaining said thrust bearing, sealing elements and spring in engagement and under compression; means providing a fluid tight seal between said one sealing element and said shaft; and means providing a fluid tight seal between said other sealing element and said housing.

2. In a device for providing a fluid-tight seal between a shaft and a housing having therein a cylindrical recess having an apertured end wall through which said shaft is disposed, the combination comprising: a compression spring encircling said shaft and seated at one end against the inner surface of said recess end wall; an inner sealing ring encircling said shaft and seated on the other end of said compression spring and, in assembly, in axially fixed relation to said other end of said spring, said inner sealing ring having an inner sealing face; a packing ring between said inner sealing ring and said housing; an outer sealing ring encircling said shaft and having an outer sealing face engaging said inner sealing face; a packing ring between said outer sealing ring and said shaft; a thrust bearing encircling said shaft and seated on said outer sealing ring; and retaining means encircling said shaft and connected to said housing and seated on said thrust bearing to maintain said spring in compression.

3. A device as defined in claim 2 wherein said retaining means is adjustably connected to said housing.

4. A device as defined in claim 2 wherein said retaining means includes a journal bearing engaging said thrust bearing and a nut engaging said journal bearing and threadedly connected to said housing.

5. A rotary shaft seal combination comprising: a wall member having an open ended recess with an internal apertured end wall; a shaft projected through said apertured end wall and recess; two seal rings, with juxtaposed ends having rotary abutted seal faces and remote ends having seating shoulders, disposed on said shaft in said recess, the one of said seal rings closest to said end wall including an annular circumscribing groove in its outer surface, and the other of said seal rings including a counterbore in its rotary seal face; a spring member compressed between the seating face of said one seal ring and the recess end wall; a thrust bearing on said shaft abutting the seating end of said other seal ring; retaining means connected to said wall member adjacent said recess and abutting said thrust bearing to maintain said thrust bearing, seal rings and spring in juxtaposed compression against said end wall; resilient O-rings disposed in said groove and said counterbore to thereby seal said one seal ring to the recess wall and said other seal ring to said shaft.

6. A rotary shaft seal as defined in claim 5 wherein the rotary sealing face of said one seal ring includes a counterbore of larger diameter than the counterbore in said other seal ring and an additional packing ring is disposed on said shaft in said large counterbore, said packing ring being sufficiently smaller than said large counterbore to provide no sealing function between said shaft and said one seal ring but of sufficient size to prevent displacement of the resilient O-ring from the counterbore in said other seal ring.

7. A rotary shaft seal combination comprising: a wall with an extension formed on one side, said extension providing an open ended recess with an internal apertured end wall; a shaft projecting through said apertured end wall and said extension; a first seal ring, with one end having a rotary seal face, the other end including a spring seat and an annular circumscribing groove in its outer surface intermediate the seal face and spring seat, disposed on said shaft in said recess with said spring seat disposed toward said end wall; a second seal ring, with one end having a rotary seal face, said one end also being provided with a counterbore, disposed on said shaft with its rotary seal face rotatably sealingly abutting the rotary seal face of said first ring; a compression spring member seated on said spring seat and disposed in said recess against said end wall; a thrust bearing on said shaft abutting the other end of said second seal ring; retaining means connected to said extension and abutting said thrust bearing to maintain said thrust bearing, seal rings and spring in juxtaposed compression against said end wall; a resilient O-ring disposed in said annular groove in sealing engagement between said first seal ring and the wall of said recess; and a second resilient O-ring disposed in said counterbore in sealing engagement between said second seal ring and said shaft.

References Cited in the file of this patent

UNITED STATES PATENTS

| 1,700,731 | Baker | Feb. 5, 1929 |
| 2,195,812 | Czarnecki | Apr. 2, 1940 |
| 2,405,464 | Storer | Aug. 6, 1946 |
| 2,554,595 | Smith | May 29, 1951 |
| 2,575,549 | Doble | Nov. 20, 1951 |
| 2,653,837 | Voytech | Sept. 29, 1953 |

FOREIGN PATENTS

| 2,969 | France | July 29, 1904 |
| | (Addition to No. 297,219) | |
| 488,761 | Canada | Dec. 9, 1952 |